Patented Sept. 15, 1925.

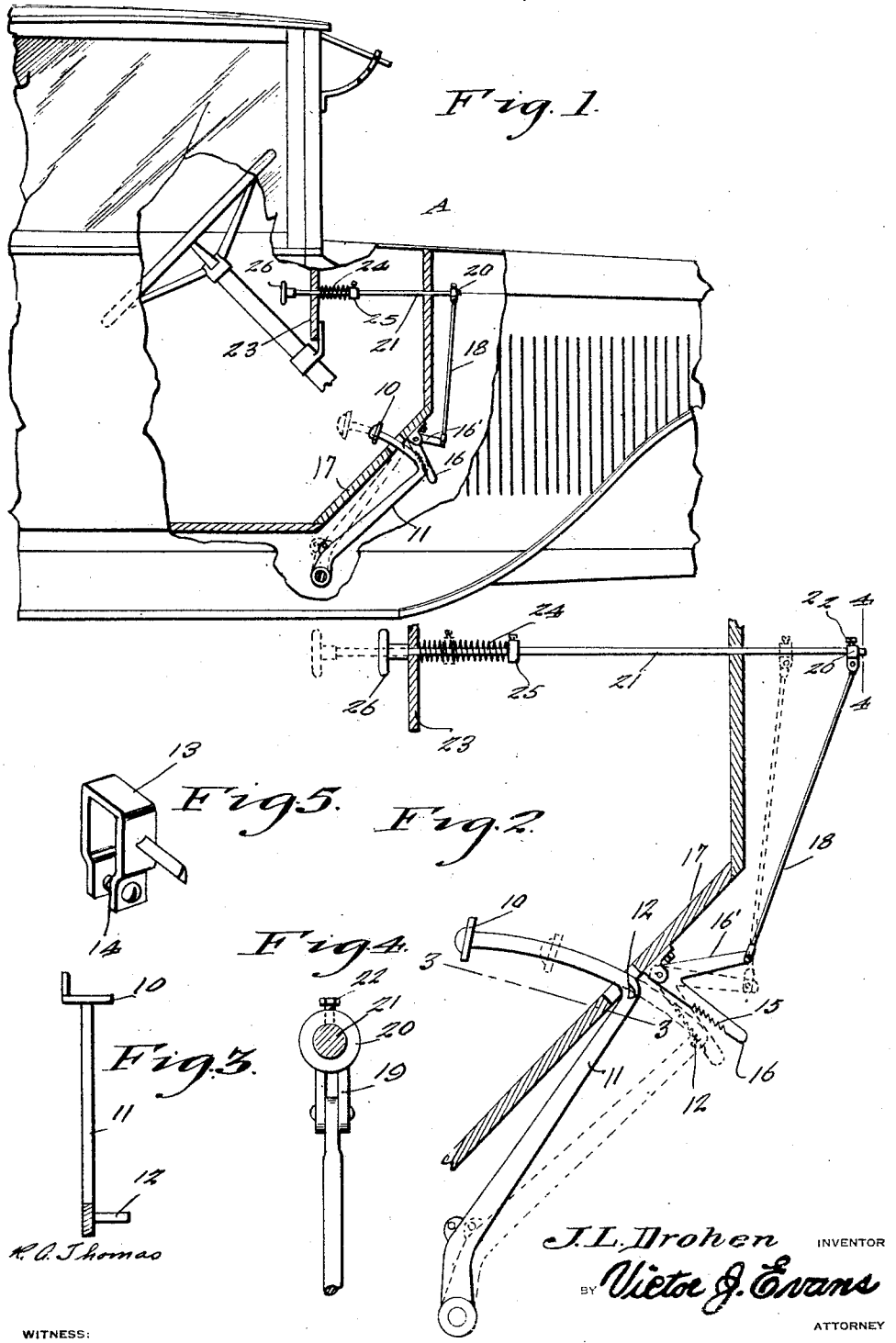

1,553,676

UNITED STATES PATENT OFFICE.

JAMES L. DROHEN, OF DUNKIRK, NEW YORK.

BRAKE LOCK.

Application filed November 25, 1924. Serial No. 752,213.

*To all whom it may concern:*

Be it known that I, JAMES L. DROHEN, a citizen of the United States, residing at Dunkirk, in the county of Chautauqua and State of New York, have invented new and useful Improvements in Brake Locks, of which the following is a specification.

This invention relates to motor operated vehicles, and contemplates the provision of means for holding the foot brake applied while the machine is at rest, thus utilizing the foot brake to assist the emergency brake in holding the car on a steep incline during the absence of the operator.

More specifically stated, the invention contemplates the provision of means designed to cooperate with the shank of the foot brake pedal to lock the latter in a depressed position and thus hold the foot brake applied as the occasion may require, said means including a manually operable rod disposed within convenient reach of the operator, and adapted to be moved in one direction to actuate the means for the purpose specified, the pedal being automatically released from said means by further depressing the pedal.

The nature and advantages of the invention will be better understood when the following detailed description is read in connection with the accompanying drawings, the invention residing in the construction, combination and arrangement of parts as claimed.

In the drawing forming part of this application like numerals of reference indicate similar parts in the several views, and wherein:

Figure 1 is a fragmentary view of the automobile partly broken away showing how the invention is mounted on the machine and how it is used in connection with the shank of the brake pedal.

Figure 2 is an enlarged view showing the application of the invention, the normal position of the parts being shown in full lines and the active position being illustrated by dotted lines.

Figure 3 is a sectional view taken on line 3—3 of Figure 2.

Figure 4 is a sectional view taken on line 4—4 of Figure 2.

Figure 5 is a perspective view of the attachment for the pedal shank.

Referring to the drawing in detail, A indicates generally a motor operated vehicle wherein 10 represents the foot brake pedal and 11 the shank thereof. In accordance with the present invention, this shank is provided with a pin 12, and the pin may form an integral part of the shank as shown in Figure 3 or it may be attached thereto in any suitable manner. For instance, the pin can be screwed into an opening formed in the shank or it may be carried by a clamp 13 designed to embrace the shank 11 and held fixed thereon by means of a fastening bolt 14. In any instance, the pin is adapted to be arranged on the shank at the bend thereof as illustrated in Figure 2, as this pin is adapted to be received by one of a plurality of notches 15 formed on the branch 16 of a bell crank lever adapted to be pivoted beneath the toe board 17. The other branch 16' of this lever is connected with the adjacent end of a rod 18, this rod being vertically disposed and having its other end pivoted between a pair of spaced lugs 19 which form part of a collar 20, the latter being arranged upon the adjacent end of a manually operable rod 21 and held fixed thereon by means of a fastening element 22. The rod 21 is horizontally disposed and slides through an opening in the dash board 23, and is normally held in the position shown by full lines in Figure 2, by means of a coiled spring 24. This spring encircles the rod 21 and is interposed between the dash board 23 and the collar 25 secured to the rod. The rod is provided with a knob or handle 26 disposed within convenient reach of the driver or operator of the machine, so that the rod can be moved in one direction when it is desired to throw the bell crank lever to its active position, and thus hold the foot brake applied.

In practice, the bell crank lever normally occupies the position shown by full lines in Figure 2, in which position it is wholly out of the way of the shank 11 of the foot pedal 10, so that the foot brake can be operated in the ordinary manner. However, when the machine is on a steep incline and it is desired to make use of the foot brake to assist the emergency brake in holding the machine immovable, it is only necessary to pull upon the rod 21 after the brake pedal has been depressed. When the rod 21 is pulled in the manner described, the rod 18 assumes the position shown by dotted lines in Figure 2, thus drawing the bell crank lever into the position illustrated by dotted lines in the said figure, wherein it will be noted that the pin 12 is received by one of the notches 15. When the foot is removed from the pedal 10, the latter cannot return to its normal position, because of the fact that the pin 12 is arranged in one of the notches 15, and in this manner the foot brake is held applied until it is released from the bell crank lever. To accomplish this it is only necessary to further depress the pedal 10 in order to move the pin out of the particular notch 15, whereupon the spring 24 above referred to, which is under tension all of the time the brake is applied functions to return the rods 18 and 21 to their normal positions and thus move the bell crank lever out of the path of movement of the pin 12.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, 1 claim:

1. The combination with a foot brake pedal including a shank, of means designed to cooperate with said shank to hold the brake applied, said means including a spring pressed lever normally arranged above said shank, and adapted to engage said shank when the latter is lowered to hold the brake applied, and a manually operable element for moving the lever to its active position against the tension of said spring.

2. The combination with a foot brake pedal including a shank, of means designed to cooperate with the shank to hold the brake applied, said means including a pivoted lever normally arranged above the shank, a manually operable element for moving said lever into active engagement with the shank, to hold the brake applied and resilient means for returning the lever to its normal position subsequent to the release of the shank therefrom.

3. The combination with a foot brake pedal including a shank, of a pin projecting laterally from the shank, a lever pivoted above the shank and having a series of notches adapted to singly receive said pin to hold the shank depressed and the brake applied, a manually operable element for moving the lever to its active position, and resilient means for automatically returning the lever to its normal position subsequent to the release of the shank therefrom.

4. The combination with a foot brake pedal including a shank, of a pin projecting laterally therefrom, a lever pivoted above the shank, and having a series of notches adapted to singly receive said pin to hold the shank depressed and the brake applied, said pin and lever being held operatively associated through the tendency of the pedal to return to its normal position, resilient means for automatically returning the lever to its normal position subsequent to the release of the shank therefrom, said shank being released by further depressing the pedal to move the pin out of said notch.

5. In a motor operated vehicle, the combination with a foot brake pedal including a shank, of a bell crank lever pivoted beneath the floor board above the shank and designed to engage the latter to hold the brake applied, a horizontally disposed rod mounted for sliding movement and arranged within convenient reach of the operator, a connection between the rod and said lever for moving the latter to its active position upon movement of the rod in one direction, and resilient means for automatically returning the lever and said rod to their normal positions subsequent to the release of the pedal.

In testimony whereof I affix my signature.

JAMES L. DROHEN